(12) United States Patent
Lyons et al.

(10) Patent No.: US 7,611,270 B1
(45) Date of Patent: Nov. 3, 2009

(54) LIGHTHEAD MOUNTING STRUCTURE

(75) Inventors: Jon H. Lyons, Haddam, CT (US);
Richard H. Morrow, Chester, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 228 days.

(21) Appl. No.: 11/899,882

(22) Filed: Sep. 7, 2007

(51) Int. Cl.
*B60Q 3/04* (2006.01)
(52) U.S. Cl. ............... 362/543; 362/545; 362/547; 362/373; 362/294; 362/542; 362/647; 362/655; 362/640
(58) Field of Classification Search ........... 362/543, 362/545, 547, 542, 373, 294, 800, 647, 655, 362/640; 248/220.43
See application file for complete search history.

(56) References Cited

U.S. PATENT DOCUMENTS

| | | | |
|---|---|---|---|
| 4,204,480 A * | 5/1980 | Hanna | 108/108 |
| 4,620,268 A * | 10/1986 | Ferenc | 362/517 |
| 5,027,260 A | 6/1991 | Lyons et al. | |
| 6,318,886 B1 | 11/2001 | Stopa et al. | |
| 6,431,728 B1 | 8/2002 | Fredericks et al. | |
| 6,511,216 B2 * | 1/2003 | Strickland | 362/542 |
| 6,641,284 B2 | 11/2003 | Stopa et al. | |
| 6,722,776 B1 | 4/2004 | Lyons et al. | |
| 6,851,835 B2 | 2/2005 | Smith et al. | |
| 6,863,424 B2 | 3/2005 | Smith | |
| 2001/0040203 A1 * | 11/2001 | Brock et al. | 248/222.11 |
| 2004/0182799 A1 * | 9/2004 | Tachibana | 211/26 |
| 2005/0057935 A1 * | 3/2005 | Lee | 362/418 |

* cited by examiner

*Primary Examiner*—Sandra L O'Shea
*Assistant Examiner*—Evan Dzierzynski
(74) *Attorney, Agent, or Firm*—Alix, Yale & Ristas, LLP

(57) ABSTRACT

A lighthead mounting structure provides both precise alignment of a lighthead and an effective heat transfer path away from heat generating components of the lighthead. Cooperating aluminum brackets are configured to lock together and overlap to provide an effective heat transfer path.

14 Claims, 8 Drawing Sheets

LIGHTHEAD MOUNTING STRUCTURE

BACKGROUND

The disclosure relates generally to warning light systems for use with motorized vehicles and, more particularly, to a lighthead mounting structure for use in such warning light systems.

Warning light assemblies mounted on emergency vehicles are well known in the art. The modern trend is toward compact, low profile, self-contained warning light assemblies. Compact and low profile warning light assemblies have improved arrow dynamic efficiency and significantly reduce the wind noise associated with higher profile designs. Warning lights are typically required to produce very bright light and as a consequence include light sources which generate significant amounts of heat. Warning lights also operate on emergency vehicles where they are exposed to the elements year round. As a consequence, warning light assemblies are typically sealed to protect internal components from exposure to the elements. Further, warning light assemblies are expected to withstand relatively high levels of shock and vibration present in their operating environments. Warning light assemblies are preferably field serviceable, allowing replacement of lightheads and other components to maintain safe lighting and warning on the vehicles equipped with the warning light assemblies. Thermal management and ease of maintenance have long been concerns of engineers designing warning light assemblies for emergency vehicles.

It would be desirable to provide a lighthead mounting structure which allows efficient field service and prevents excess accumulation of heat inside the warning light assemblies in which it is used.

SUMMARY

The disclosed lighthead mounting structure provides both precise alignment of a lighthead and an effective heat transfer path away from heat generating components of the lighthead. Each lighthead includes a substantially planar thermally conductive PC board with LEDs and current source components mounted to the board that generate heat when power is applied. The back side of the PC board is compressed against the upright portion of an L-shaped lighthead bracket. The disclosed lighthead bracket is constructed of thermally conductive sheet aluminum material and includes laterally spaced alignment tabs extending from a lower flange. The lower flange is substantially perpendicular to the upright portion of the lighthead bracket and defines a fastener opening.

The lighthead mounting structure includes a mounting bracket of thermally conductive material having a substantially planar mounting surface. The disclosed mounting bracket is longitudinally extended, defining sets of tab receptacles and fastener openings complementary to the alignment tabs and fastener opening of the lighthead bracket lower flange.

Lightheads are secured in a predetermined fixed orientation with respect to the mounting bracket by inserting the alignment tabs into a selected set of tab receptacles and inserting a fastener through the fastener openings defined by the lighthead bracket lower flange and mounting bracket. The lighthead bracket and mounting bracket overlap in face to face relationship to form a robust thermal path for heat generated electronic components in the lightheads.

DETAILED DESCRIPTION

Figure 1:
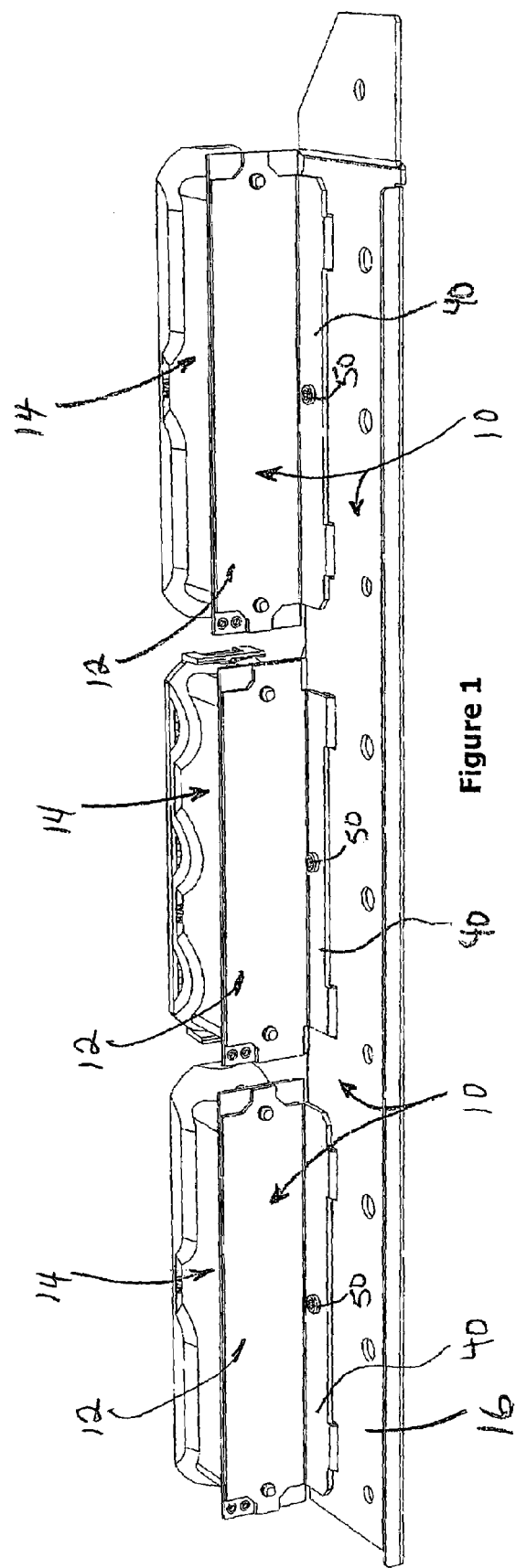
FIG. 1 is a rear perspective view of a warning light sub-assembly including an embodiment of a lighthead mounting structure according to the disclosure.
Figure 2:
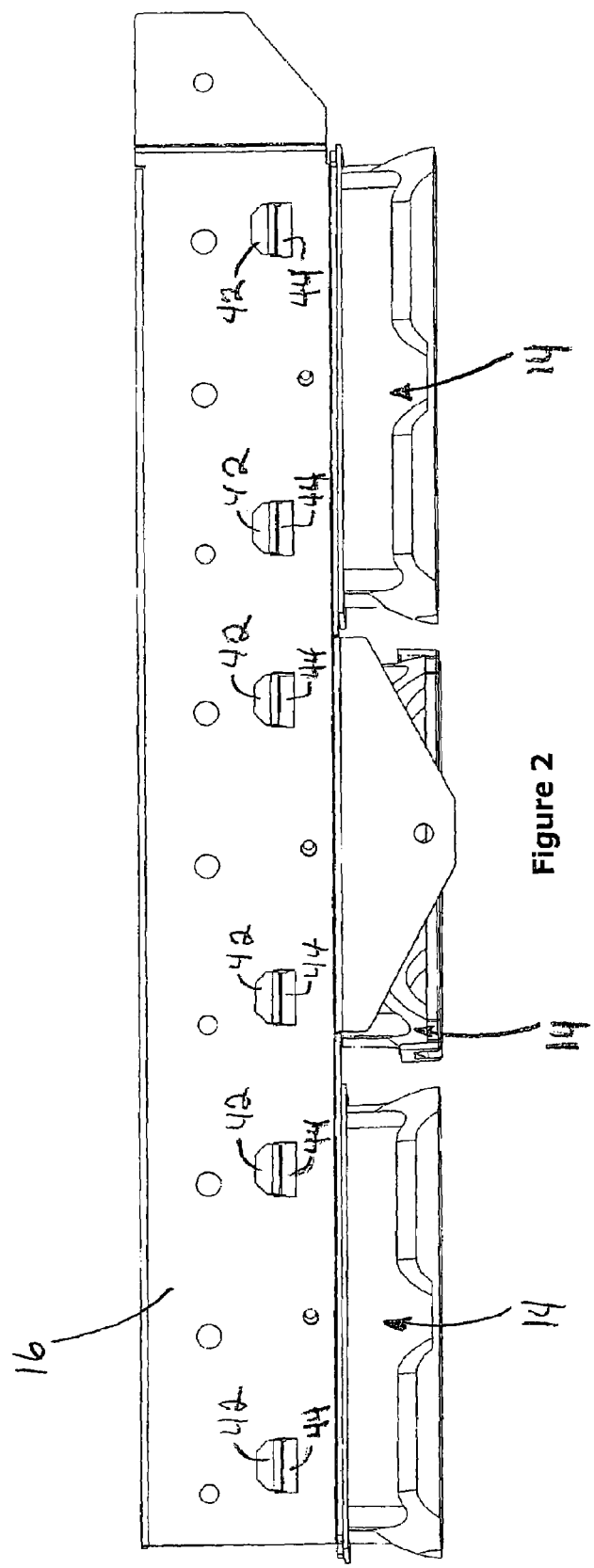
FIG. 2 is a bottom plan view of the warning light sub-assembly of FIG. 1.
Figure 3:
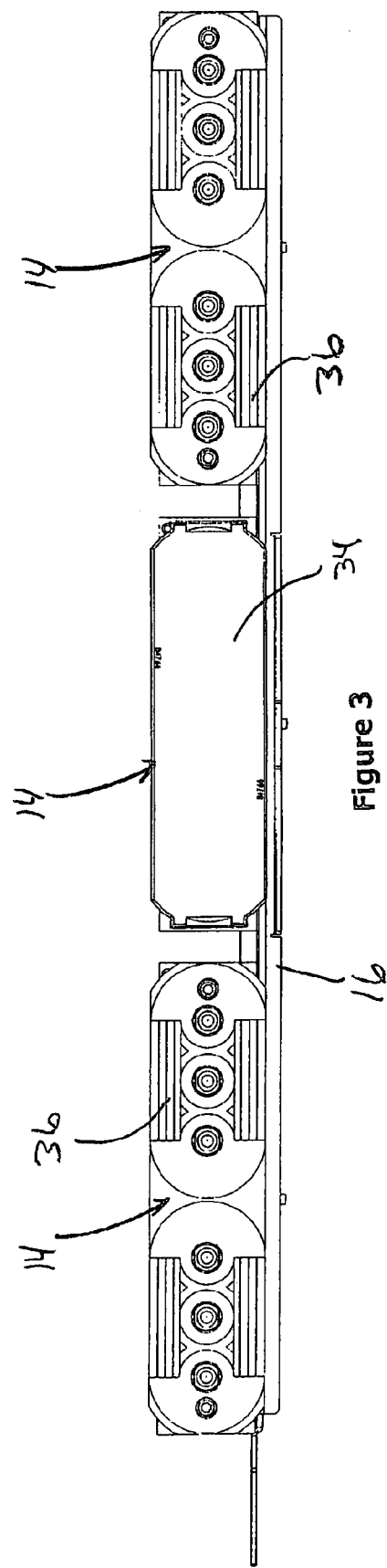
FIG. 3 is a front elevation view of the warning light sub-assembly of FIGS. 1 and 2.
Figure 4:
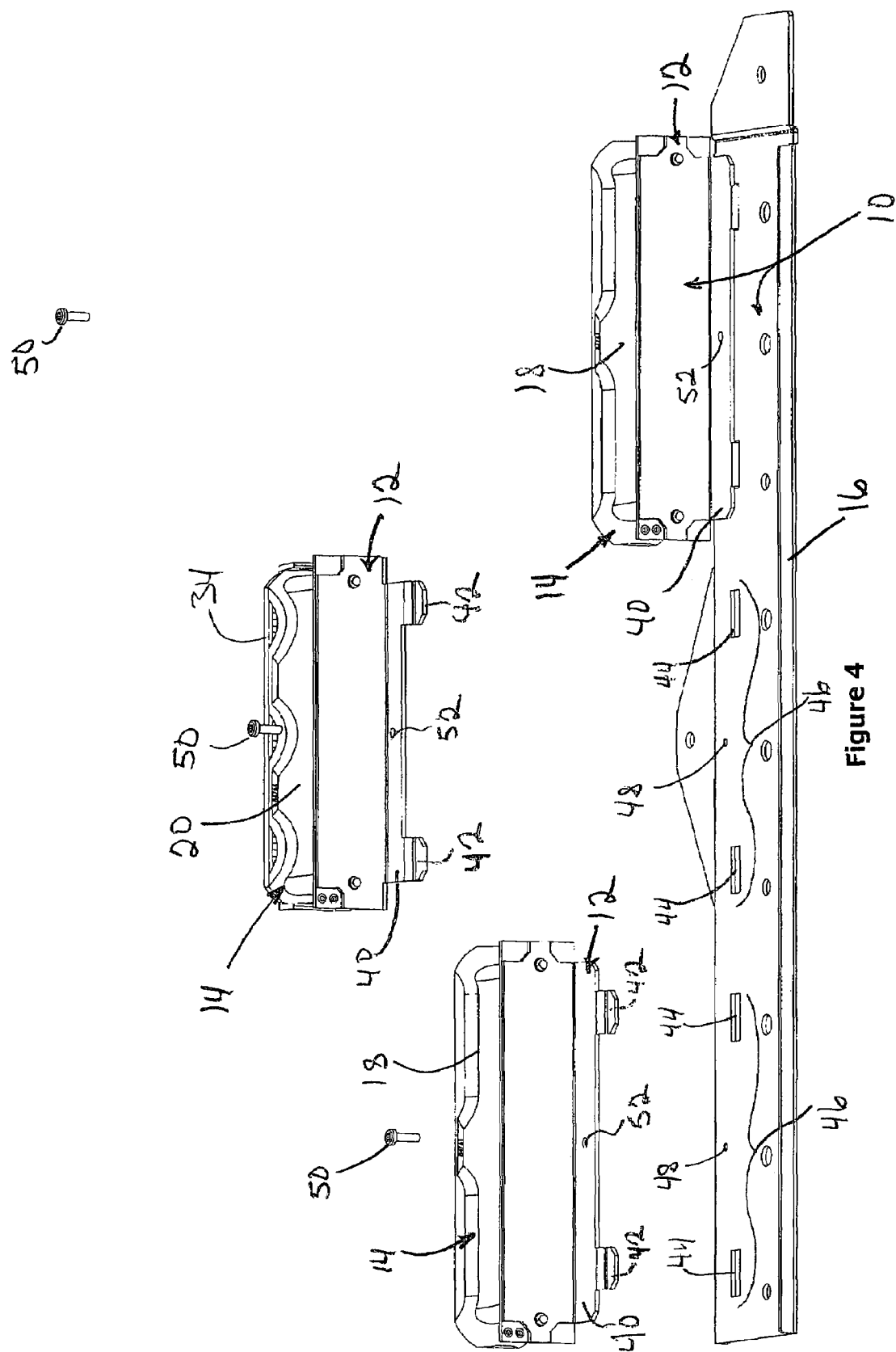
FIG. 4 is a rear exploded view of the warning light sub-assembly of FIGS. 1-3.

Embodiments of a lighthead mounting structure will now be described with reference to the Figures, wherein like numerals refer to similar parts. FIGS. 1-4 illustrates an embodiment of a lighthead mounting structure 10 according to aspects of the disclosure. A lighthead mounting structure 10 according to the disclosure includes a first bracket 12 fixed to each lighthead 14, and a second bracket 16 for retaining the lightheads 14 in a predetermined fixed relationship with respect to a warning light assembly (not shown). The first and second brackets 12, 16 are constructed of thermally conductive material and are configured to provide a thermal path away from heat generating components in the lightheads 14.

Figure 8:
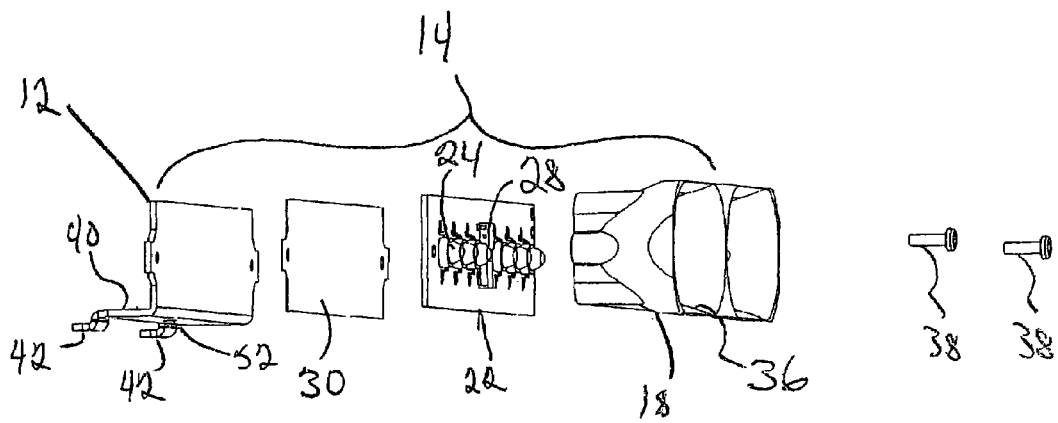
FIG. 8 is a left side exploded perspective view of a lighthead according to the disclosure.
Figure 9:
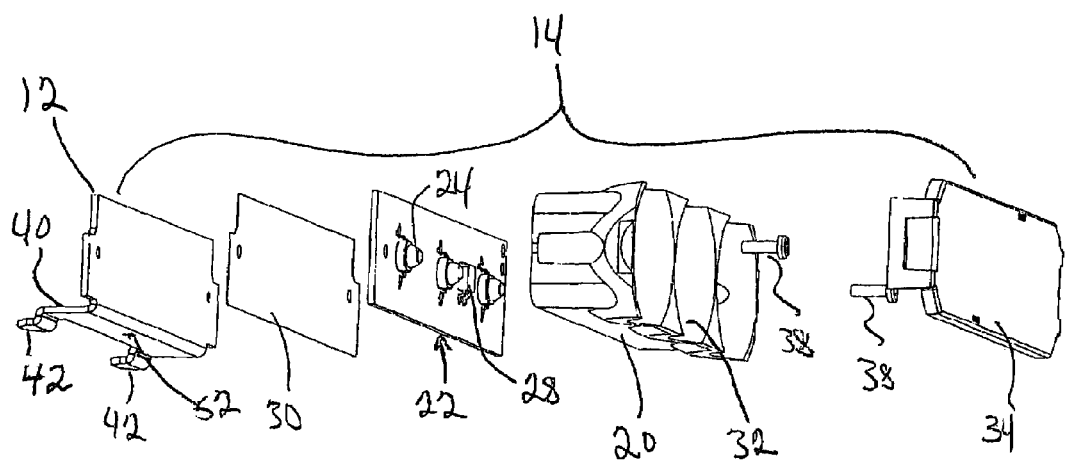
FIG. 9 is a left side exploded perspective view of an alternative lighthead according to the disclosure.

FIGS. 8 and 9 are exploded perspective views of representative lightheads 14 configured for use with the disclosed lighthead mounting structure. Each lighthead 14 includes a reflector 18, 20, a PC board 22 carrying LED light sources 24 and current source components 28, a thermally conductive gasket 30 and an L-shaped bracket 12. The disclosed L-shaped lighthead brackets 12 are constructed of sheet aluminum that is cut and bent to the illustrated shape. Other materials and methods of manufacture may be compatible with the disclosed lighthead mounting structure.

Each reflector 18, 20 defines generally concave reflecting surfaces arranged to organize (collimate) light from the LEDs into a beam. The circular reflecting surfaces 32 of the reflector 20 shown in FIG. 9 produce a vertically and horizontally collimated (circular) beam and may be provided with optics 34 to enhance the horizontal and/or vertical spread of the radiation pattern. The trough shaped reflecting surfaces 36 of the reflector 18 of FIG. 8 are configured to produce a vertically collimated beam that has a wide horizontal spread (a wide angle beam). It will be understood by those familiar with this field that the terms "vertical" and "horizontal" depend upon the orientation of the lighthead.

Each of the illustrated PC boards 22 may be a metal core PC board or a standard fiber board. If the PC board is a fiber board, it will include thermally conductive features, such as thermal vias (copper plated through holes), arranged in proximity to the heat producing electronic components mounted to the PC board to facilitate heat transfer through the board.

The illustrated PC boards show LEDs 24 and current source components 28, such as transistors, which generate heat during operation. In the illustrated lightheads 14, the PC board 22 and thermally conductive gasket 30 are compressed between the reflector 18, 20 and lighthead bracket 12 by two screws 38. The depth and sidewalls of the reflectors 18, 20 make them quite rigid, while the lighthead bracket 12 is stiffened by the right-angle bend and lower flange 40. The rigid reflector 18, 20 and rigid bracket 12 cooperate to compress the PC board 22 and thermally conductive gasket 30 against the bracket to provide a good thermal interface from the PC board 22 to the bracket 12.

Figure 5:
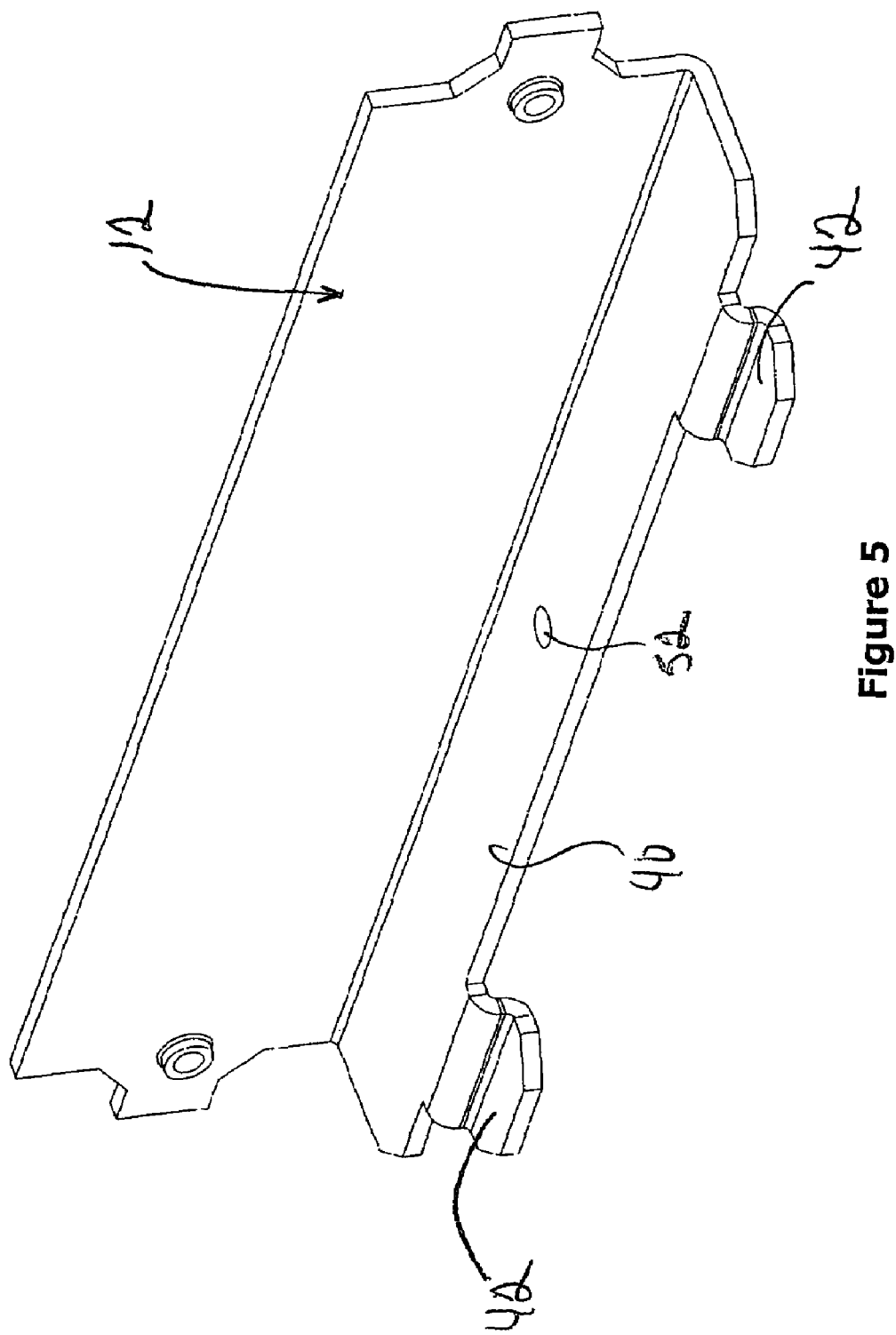
FIG. 5 is a rear perspective view of a lighthead bracket as shown in FIGS. 1-4.
Figure 6:
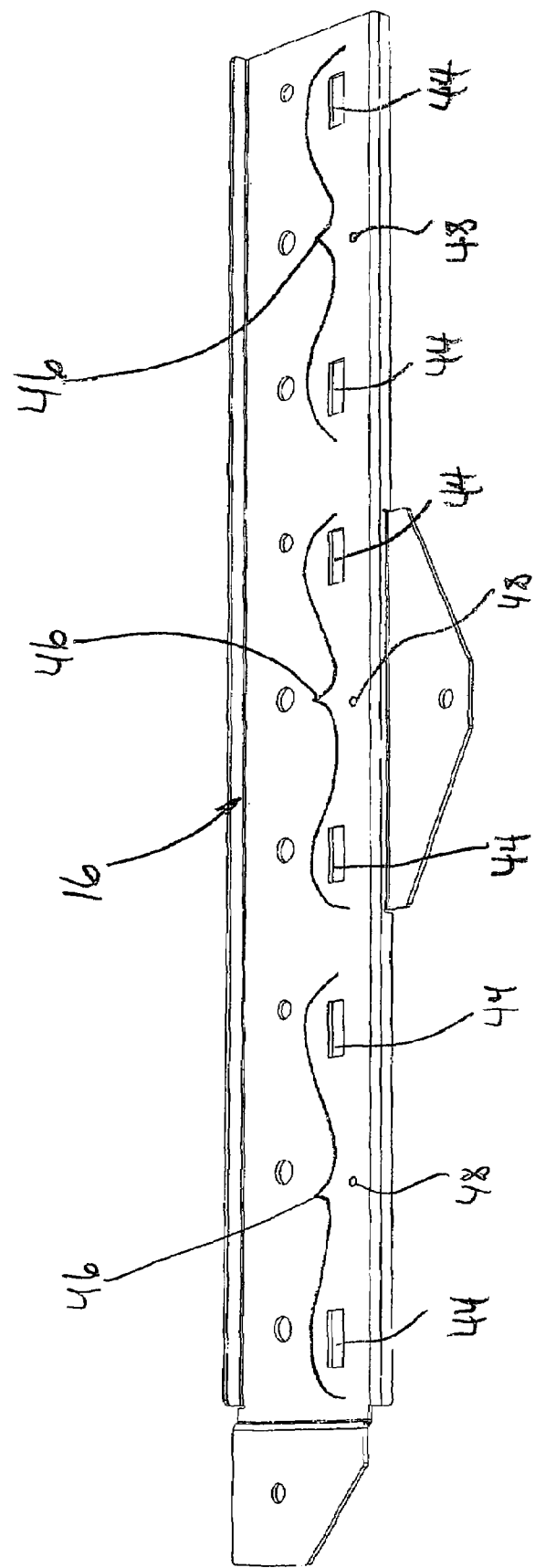
FIG. 6 is a front perspective view of a mounting bracket as shown in FIGS. 1-4.

The lower flange 40 of each bracket includes a pair of spaced apart alignment tabs 42. Each alignment tab 42 has an S-shaped configuration stepping downwardly and away from the lower flange 40. Each alignment tab 42 also includes beveled corners as best seen in FIG. 5. The alignment tabs 42 are configured to be received in alignment slots 44 defined by the mounting bracket 16. The mounting bracket 16, illustrated in FIGS. 1-4, 6 and 7, defines three longitudinally spaced locations 46 for lightheads. Each location 46 for a lighthead includes two alignment slots 44 and a fastener opening 48. A lighthead 14 is secured to the mounting bracket 16 by inserting the alignment tabs 42 in a selected pair of alignment slots 44 and threading a fastener 50 through the fastener opening 52 in the lighthead bracket 12 and the corresponding opening 48 in the mounting bracket.

As shown in FIGS. 1-4, the lightheads 14 are configured such that they are compatible with any lighthead location 46 on the mounting bracket 16. The disclosed arrangement of interlocking tabs and slots 42, 44 provides a simple means of attaching various lightheads to a warning light structure in a fixed predetermined configuration. The disclosed arrangement of tabs and slots reduces the number of fasteners necessary to assemble a warning light. The disclosed configuration promotes ease of assembly and service.

Figure 7:
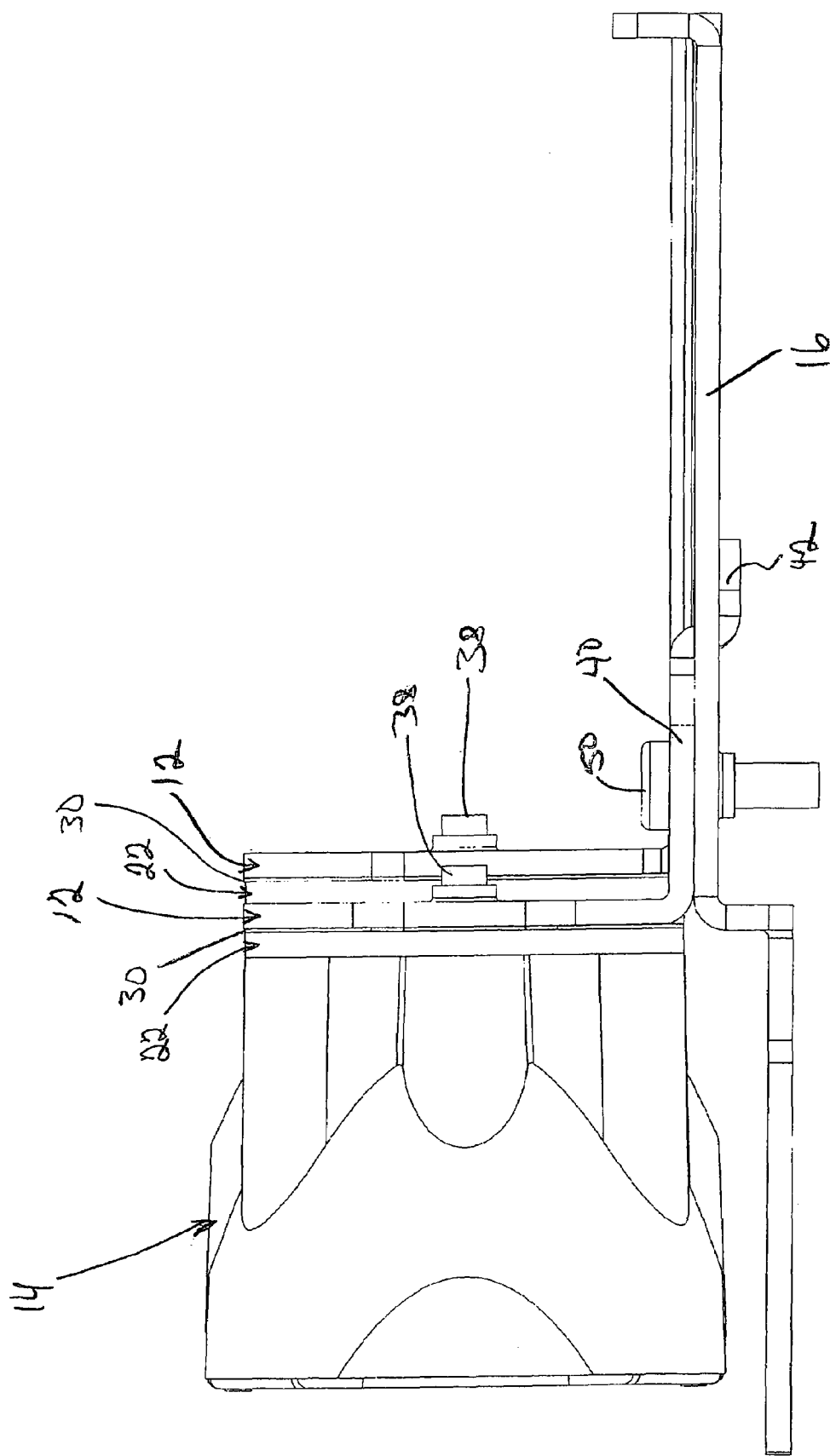
FIG. 7 is an enlarged side plan view of the warning light sub-assembly of FIGS. 1-3.

One objective of the disclosed lighthead mounting structure 10 is to provide a conductive thermal path away from the heat generating components of the lighthead 14. In this case, the brackets 12, 16 are manufactured from aluminum, which is an excellent conductor of heat. The lower flange 40 of each lighthead bracket 12 extends along substantially the entire length of the lighthead and extends rearwardly to provide a large surface area overlap with the mounting bracket as shown in FIG. 7. The fastener 50 used to secure each lighthead 14 to the mounting bracket 16 is located substantially in the middle of the lower flange 40 and when tightened compresses the lower flange against the mounting bracket 16 to promote heat transfer. The overlapping surfaces of the brackets 12, 16 provide a large and efficient thermal path to conduct heat away from the heat generating components of the lightheads.

The mounting bracket may be arranged to interface with other thermally conductive structures to continue the movement of heat away from the lightheads by conduction. It should be noted that as the temperature of the lightheads and/or brackets increase, some heat will be radiated into the ambient environment from these hot surfaces and a small amount of heat will be removed by convection via the movement of air past the brackets.

The disclosed lighthead mounting structure provides a simple and efficient structure for securing lightheads in a predetermined fixed relationship to a warning light assembly where the mounting structure also plays a significant role in removing heat from heat generating components of the lighthead.

While embodiments of the disclosed lighthead mounting structure have been shown and described, various modifications and substitutions may be made thereto. Accordingly, it is understood that the present embodiments have been described by way of illustration and not limitation.

What is claimed is:

1. A thermal transfer and support assembly comprising:
   a substantially planar thermally conductive support;
   a heat generating electronic component mounted in thermally conductive relationship to a first side of said support;
   a first bracket secured to a second side of said support, said first bracket constructed of thermally conductive material and arranged to conduct heat away from said support, said first bracket comprising a first flange facing said support and a second flange substantially perpendicular to said first flange, said second flange including a locating tab and a first fastener opening;
   a second bracket of thermally conductive material comprising a substantially planar mounting surface, said mounting surface defining a tab receptacle and a second fastener opening; and
   a fastener,
   wherein said first bracket is secured in a predetermined fixed orientation with respect to said second bracket by inserting said locating tab into said tab receptacle and inserting said fastener through said first and second fastener openings, said first bracket second flange and said second bracket mounting surface providing a thermal pathway for heat generated by said heat generating electronic component.

2. The thermal transfer and support assembly of claim 1, wherein said locating tab comprises a pair of spaced apart locating tabs, each said locating tab having a distal end in a plane offset from said second flange and said tab receptacle comprises two tab receptacles complementary to said pair of locating tabs.

3. The thermal transfer and support assembly of claim 2, wherein said first and second fastener openings are located equidistant from said pair of locating tabs and said two tab receptacles, respectively.

4. The thermal transfer and support assembly of claim 1, wherein said first bracket has a length and said second bracket has a length at least twice that of said first bracket, said second bracket including a plurality of tab receptacles and second fastener openings to define a plurality of locations for mounting said first bracket.

5. The thermal transfer and support assembly of claim 1, wherein said second bracket includes a longitudinally extending portion configured to overlap with an adjacent bracket and provide a thermally conductive interface thereto.

6. A warning light for use with a motorized vehicle, said warning light comprising:
   a lighthead having an intended direction of light emission, said lighthead comprising:
      a thermally conductive LED support having first and second substantially planar surfaces;
      a plurality of LED light sources, each said LED light source having a die, an optical axis originating at said die and a thermal slug, said die emits light when power is applied to said LED, said light emitted on a first side of said slug in a pattern surrounding said optical axis, said LED light sources mounted with a second side of said slug in thermally conductive relationship to said first side of said support;
      a reflector defining at least one opening and a generally concave reflecting surface, said reflector mounted to said first side of said support with said LED light sources positioned in said at least one opening so that light from said plurality of LEDs passes through said reflector; and a first bracket constructed of thermally conductive material and comprising first and second substantially planar flanges, said first flange being perpendicular to said second flange, said first flange secured to said support second side in thermally conductive relationship thereto and said second flange comprising an alignment tab and a first fastener opening;

a fastener; and a second bracket constructed of thermally conductive material and having a substantially planar mounting surface, said mounting surface defining an alignment slot and a second fastener opening, said alignment tab received in said alignment slot and said fastener received through said first and second fastener openings to secure said first bracket to said second bracket in a pre-determined fixed relationship, said first bracket defining a conductive heat transfer path from said support to said second bracket.

7. The lightbar of claim 6, wherein said first and second brackets are constructed of sheet aluminum.

8. The lightbar of claim 6, wherein said second flange is mounted in face-to-face contact with said second bracket mounting surface.

9. The lightbar of claim 6, wherein said support has a length and said first bracket first and second flanges extend along a major portion of the length of said support, said alignment tab comprising two spaced apart alignment tabs projecting from a peripheral edge of said second flange, said fastener opening located intermediate said alignment tabs.

10. The lightbar of claim 6, said second bracket comprising a stiffening lip projecting substantially perpendicular to said mounting surface along substantially the entire length of said second bracket.

11. The lightbar of claim 6, wherein said second bracket mounting surface defines sets of alignment slots and second fastener openings for a plurality of lighthead first brackets.

12. A lighthead mounting assembly comprising:

a lighthead comprising a first sheet metal bracket, said first bracket comprising first and second perpendicular planar flanges adjoining at a bend, said second flange including a pair of protruding alignment tabs and defining a first fastener opening;

a second sheet metal bracket having a mounting surface defining a pair of alignment slots and a second fastener opening arranged to cooperate with the alignment tabs and first fastener opening of said lighthead; and a fastener, wherein said alignment tabs are received in said alignment slots and said fastener extends through said first and second fastener openings to secure said lighthead to said second bracket in a pre-determined fixed relationship.

13. The lighthead mounting assembly of claim 12, wherein said second bracket defines alignment slots and a second fastener openings for receiving a plurality of first brackets.

14. The lighthead mounting assembly of claim 12, wherein said first and second fastener openings are intermediate said alignment tabs and alignment slots.

* * * * *